C. H. HAPGOOD.
SCALE BEARING.
APPLICATION FILED APR. 2, 1917.
1,294,450.
Patented Feb. 18, 1919.
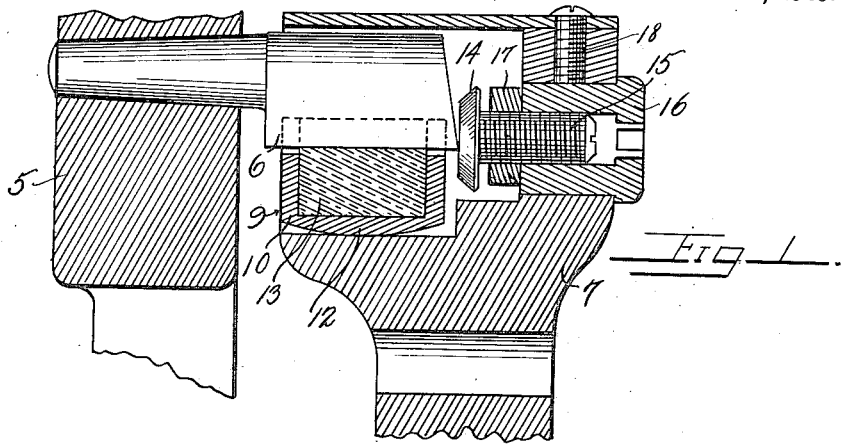
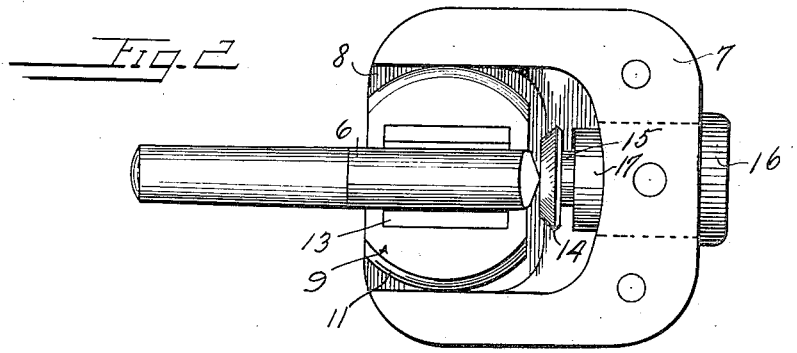
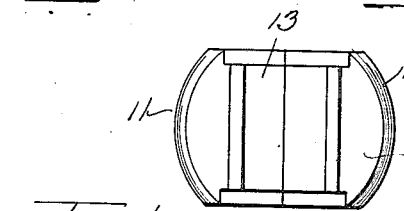
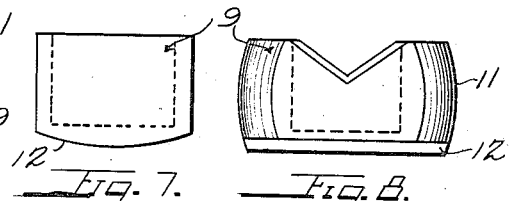
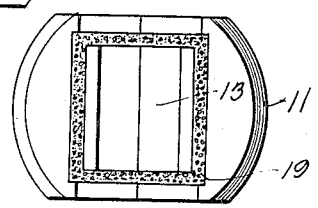
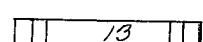
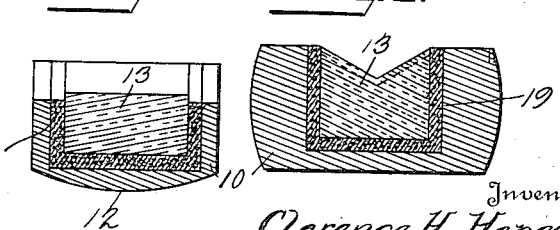
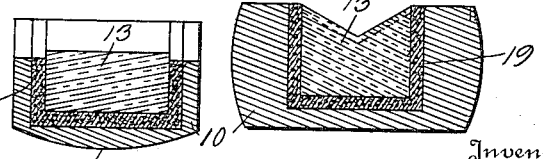
Witnesses
Inventor
Clarence H. Hapgood
By George R. Frye
Attorney

UNITED STATES PATENT OFFICE.

CLARENCE H. HAPGOOD, OF TOLEDO, OHIO, ASSIGNOR TO TOLEDO SCALE COMPANY, OF TOLEDO, OHIO, A CORPORATION OF NEW JERSEY.

SCALE-BEARING.

1,294,450.  Specification of Letters Patent.  Patented Feb. 18, 1919.

Application filed April 2, 1917. Serial No. 159,233.

*To all whom it may concern:*

Be it known that I, CLARENCE H. HAPGOOD, a citizen of the United States, residing at Toledo, in the county of Lucas and State of Ohio, have invented certain new and useful Improvements in Scale-Bearings, of which the following is a specification.

This invention relates to pivotal supports or bearings for levers or beams of weighing scales or other pivotal parts thereof, and the principal object is to provide a self regulating bearing which will insure the proper alinement between the knife edges of the lever pivots or like parts and the V-grooves of the bearings without requiring any special mounting of the bearings in place. Perfect alinement is practically essential to absolute accuracy in the operation of weighing scales, for otherwise the pivot of the beam or lever will not maintain the required fixed relation to weighing and indicating elements which it operates, such, for example, as a pendulum, and there would be like discrepancy with non-alining bearings at other points. Heretofore it has been the custom to first mount bearing blocks upon resilient members for the purpose of causing them to be pressed into engagement with the knife edges to secure the proper alinement and then to fix the bearings in the place so determined by cement. Not only is this practice attended with considerable difficulty, but in many instances it does not result in permanent alinement, for the cement is apt to shrink or settle irregularly.

With the above and other objects in view which will readily appear as the invention is better understood, my invention consists in the novel construction, combination and arrangement of parts to be hereinafter more fully described and particularly pointed out in the subjoined claims.

Reference is to be had to the accompanying drawings illustrating preferred embodiments of my invention and wherein similar reference numerals designate similar parts throughout the several views.

In the drawings:—

Figure 1 is a fragmental sectional view of a portion of a scale lever illustrating the manner in which my improved bearing is used for supporting a pivotal portion of a weighing scale; Fig. 2 is a plan view of the pivot and bearing in assembled position; Fig. 3 is a detail plan view of the bearing; Figs. 4 and 5 are end and side views thereof; Fig. 6 is a detail plan view of another embodiment; and Figs. 7 and 8 are respectively transverse and longitudinal sections therethrough.

Referring to the drawings, the numeral 5 designates a lever or beam of ordinary form and intended to illustrate a moving part of a weighing scale carrying a knife-edge pivot 6 upon which it oscillates, it being understood that as usual in scale practice there would be provided a pair of alined pivots extending transversely outward on each side of the lever, and serving as trunnions to support the lever. Inasmuch as the present invention does not depend for its operation upon any particular form of scale mechanism, no attempt is made in this application to show a complete scale mechanism, nor to delineate the action of the scale in its load-counterbalancing operations, only so much of the scale mechanism being shown as is necessary to clearly portray the co-action with the scale bearing forming the claimed invention herein disclosed.

The numeral 7 designates a bracket recessed as at 8 to provide a seat for the bearing 9, the floor of the recess being flat and the sides at substantially right angles thereto. The bearing 9 comprises a casing 10 of metal or other suitable substance having rounded end portions 11 arranged to each contact the end walls of the recess and roll thereon when the bearing is in place, and an arcuate bottom portion 12 arranged to rest upon the level floor of the recess and shaped so as to rock thereon transversely of the bearings. The casing 10 is provided with a central aperture or seat for the agate or similar hard substance 13 adapted to contact the knife edge of the pivot 6, the agate being provided with a central V-groove in which the pivot rests, the notch of the groove being centrally located between the rounded end walls 11 of the bearing. It will be obvious that with such a construction as above described, the bearings will adjust themselves to the knife-edge pivots 6 however the knife edges thereof may extend, and that the latter will seat themselves squarely in the notches of the V-grooves. This is due to the fact that the bearing is free to rock transversely upon its arcuate bottom portion and to move around as may be necessary to slightly change the direction of the V-groove by means of its rounded ends 11 turning upon the sides of the recess.

Of course, if absolute accuracy and uniformity could be insured in practice in the casting of the lever and the bracket and in the turning out of the pivots and the fixing of the same to the levers, and likewise in the construction of the bearings and the fixing of the latter in the recess of the bracket, there would be no need of introducing the rocking or self-alining bearing blocks herein disclosed or of resorting to other devices for the purpose of securing proper alinement, but it will, of course, be understood that uniformity and exactness in the particulars above noted are not attainable in ordinary shop practice, and, considering the accuracy demanded of scales and weighing machines, it becomes necessary to compensate for the slight irregularities or non-uniformities bound to occur in the manufacture and assembling of the parts. It will be readily seen that the construction and arrangement herein disclosed solves the difficulty in a simple and effective manner, doing away entirely with preliminary adjustment of bearings to knife edges and the fastening of the bearings in place when so adjusted, while at the same time insuring a constant and permanent alinement and a fixed relationship between the beam pivot and other parts of the scale, since the knife edges are sure to seat in the notches of the V-grooves from end to end thereof.

The usual or any desired means of providing for the end thrust of the pivot may be employed with my improved bearing. Thus, the thrust plate 14 may be arranged at the extremity of a threaded shaft 15 meshing in the socket 16 extending through an opening in the bracket 7 adjacent the recess 8, suitable locking means, such as the lock nut 17 and set screw 18, being provided to maintain the desired adjustment.

In Figs. 6–8 inclusive, I have shown a modified manner of securing the agate block 13 within the casing 10. In this embodiment the central opening in the casing is made of larger dimensions than in the preceding modification and the agate or other block 13 adapted to contact the knife edge is centered therein by means of cement or other suitable material, it being thus possible to so relate the agate block with the rounded ends and arcuate bottom of the bearing that the V-groove of the agate will be centrally disposed therein. Thus, agates in which the V-groove is not located in the exact center, such as are frequently met with in practice, may be seated within the aperture of the bearing and fixed therein with cement, as shown at 19, the agate itself being not centrally arranged but the groove thereof disposed in exact central position within the bearing. The casing 10 of the bearing in this construction is provided with similar arcuate bottom and rounded ends, as in the first described embodiment.

While the illustrated embodiments of my invention herein disclosed are well calculated to adequately fulfil the objects primarily stated, it is to be understood that the invention is susceptible of variation, modification and change without departing from the spirit and scope of the invention as set forth in the subjoined claims.

Having described my invention, I claim:

1. A bearing of the character described comprising a casing having rounded end and bottom portions, and a grooved insert mounted therein.

2. A bearing comprising a casing and a block of hardened material mounted therein, the bottom portion of the bearing being curved outwardly to form a seat for the bearing rockable in a transverse direction.

3. A bearing comprising a casing and a block of hardened material mounted therein, the bottom portion of the bearing being curved to permit rocking in a transverse direction, and the end portions thereof rounded to permit turning of the bearing.

4. The combination with a pivotal part having a knife edge, of a bearing having a curved bottom portion and rounded end portions, and a hardened insert provided with a groove disposed centrally within the bearing in position to contact the pivot.

5. The combination with a pivotal part having a knife edge, of a bearing having a curved bottom portion arranged to permit rocking in a transverse direction, and rounded end portions arranged to permit rotative movement, and a hardened insert provided with a groove disposed centrally within the bearing in position to contact the pivot.

CLARENCE H. HAPGOOD.

Witnesses:
C. F. MILLER, Jr.
R. HECKLER.